Oct. 25, 1966     H. G. DEHMELT     3,281,709
APPARATUS FOR OPTICAL ALIGNMENT AND DETECTION
OF ATOMIC ENERGY STATES
Filed Feb. 5, 1963
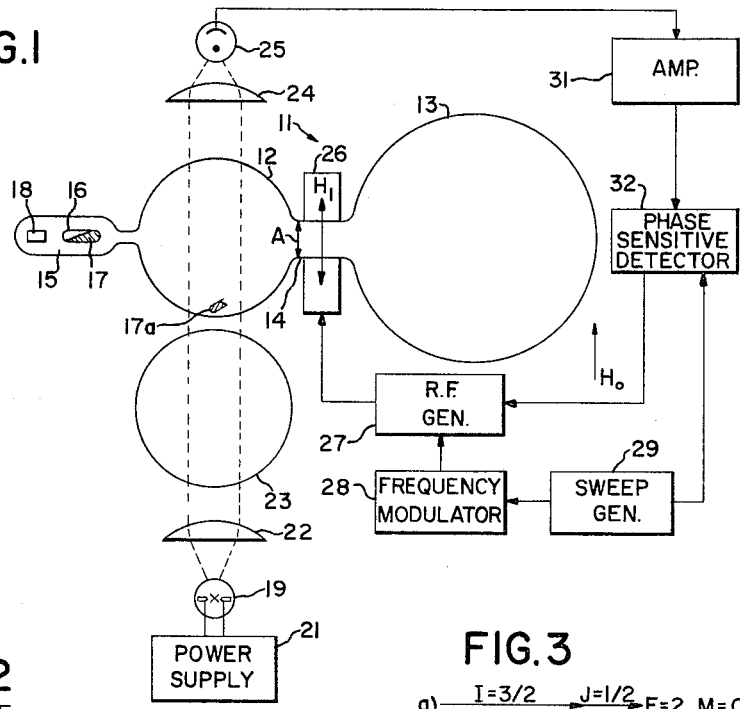
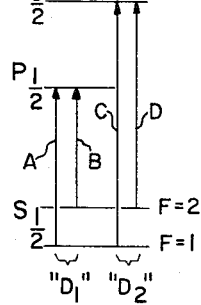
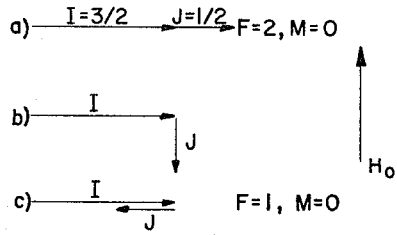
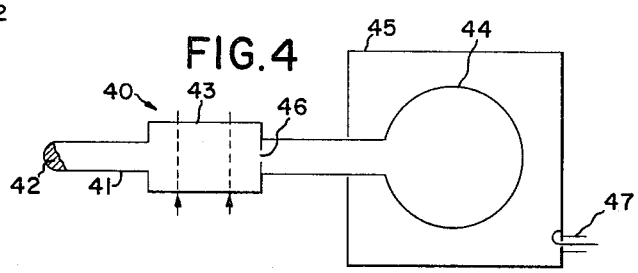
INVENTOR.
HANS G. DEHMELT
BY
*J. E. Rosenblum*
ATTORNEY

United States Patent Office 3,281,709
Patented Oct. 25, 1966

3,281,709
APPARATUS FOR OPTICAL ALIGNMENT AND DETECTION OF ATOMIC ENERGY STATES
Hans George Dehmelt, Seattle, Wash., assignor to Varian Associates, Palo Alto, Calif., a corporation of California
Filed Feb. 5, 1963, Ser. No. 256,453
12 Claims. (Cl. 331—3)

This application is a continuation-in-part of U.S. patent application 784,739, filed January 2, 1959, now abandoned.

The present invention relates in general to quantum resonance apparatus, and more particularly to improved methods and apparatus for producing storage cell structures which enable long lifetimes for atoms in a preferentially populated spin state and which provide sharper resonance lines and increased signal-to-noise ratio.

The present invention discloses improved methods and apparatus over those optical absorption systems shown and described in the following copending U.S. patent applications of the present inventor Hans George Dehmelt: Serial No. 649,190, entitled "Optical Absorption Monitoring of Aligned Alkali Atoms" filed March 28, 1957, abandoned in favor of Serial No. 313,186, filed October 2, 1963; Serial No. 649,191 entitled "Gyromagnetic Resonance of Optically Aligned Alkali Atoms" filed March 28, 1957, abandoned in favor of Serial No. 350,877, filed March 9, 1964, also abandoned in favor of Serial No. 407,422, filed October 29, 1964; and Serial No. 653,180, entitled "Modulation of a Light Beam by Absorbing Quantum Systems Exhibiting a Periodically Varying Alignment," filed April 16, 1957, now U.S. Patent 3,150,313, all assigned to the same assignee. Detailed theory of the alignment of a one optical electron quantum system such as alkali atoms by optical pumping and the subsequent detection of said alignment by optical detection is set forth in these prior patent applications and reference is made thereto for such detailed analysis.

In the systems disclosed in these prior patent applications there was provided a single region cell containing a suitably quantized system, such as atoms of an alkali vapor which are exposed to a weak unidirectional magnetic field. Optical radiation of such spectral properties as will align or orient the atoms, that is, will cause certain energy sublevels or spin states to become overpopulated with atoms at the expense of other sublevels, is transmitted through the cell and the alignment is then monitored by the intensity of optical radiation which passes through the cell without absorption; any process which tends to disorient or vary the alignment of the atoms is then detected by corresponding changes in the transmitted intensity of the monitoring optical radiation. Among such disorientation processes are those wherein electromagnetic energy is applied to the cell at a frequency which will produce (1) field dependent Zeeman level and hyperfine transitions or (2) field independent hyperfine transistions; that is, in the first type of transition (used, for example, in magnetometer systems) the frequency corresponding to the energy difference between sublevels varies directly with the unidirectional magnetic field strength and in the second type (used, for example, in frequency standard systems) the frequency is independent of field strength. The line width associated with such transitions (which may be observed, for example, in the resonance line signal contained in the output of the optical radiation detector as the frequency of the electromagnetic energy is slowly swept through the transition resonance frequency) varies inversely as the overage lifetime ($\tau$) of an atom in the preferentially populated spin state. Thus, a large value of $\tau$ is desirable in such systems as precision magnetometers and frequency standards which require highly resolved gyromagnetic lines.

These prior patent applications disclose a technique for increasing the lifetime of quantum mechanical particles characterized by one optical electron, such as alkali atoms, by adding a suitable buffer gas to the cell, argon in the case of sodium atoms, thereby preventing atoms from undergoing disorienting collisions with the walls of the gas cell and increasing the thermal relaxation time. Such a cell is found to be subject to a number of undesirable limitations. The presence of the buffer gas greatly restricts the free motion of atoms within the cell and thus gives rise to substantial Zeeman transition line broadening due to magnetic field inhomogeneities over the volume of the cell. Additionally collisions between the alkali atoms and the buffer gas give rise to very short liftetimes in the optically excited $^2P$ states of the alkali atom; this short lifetime causes the presence of the so-called "$D_2$" line in the incident optical radiation to reduce the net atom alignment, as where it is desired to preferentially populate the $F=2$, $M=2$ sublevel of the $^2S_{1/2}$ ground state, thus often necessitating the use of an expensive interference filter to suppress the "$D_2$" line. A still further disadvantage of the presence of a buffer gas in the cell is that it causes the frequency of the field independent hyperfine transitions to be dependent on the pressure of the buffer gas, thus giving rise to undesirable temperature instabilities.

In addition to the limitations imposed by the presence of a buffer gas, other undesirable limitations are imposed by the use of a single cell region for both optical absorption and disorienting electromagnetic transition processes. In order for the disorientation process to produce a strong signal it is necessary to pass the maximum possible amount of light flux through the cell. This light flux may be represented by the equation:

(1) (Light flux) = (light intensity) × (cross-sectional area of light beam in the cell)

If one attempts to greatly increase the light intensity, it is found that the pumping time required to establish an alignment is significantly shorter than the thermal relaxation time and becomes the limiting factor in determining the lifetime of the atoms in the preferentially populated sublevel of the ground state, thus causing an undesirable broadening of the available resonance signal. On the other hand, the effective area of the beam is limited by the size of cell, itself; and a single region cell cannot be made larger than about one-quarter wavelength at the frequency of the disorienting energy without destroying the necessary phase coherence between the disorienting electromagnetic field and the interacting magnetic moments associated with the atom spin states. In the case of hyperfine transitions this limitation may restrict the effective beam cross-section to as little as 1 square centimeter or smaller. Another limitation of a single region cell is that the simultaneous presence of optical and radio frequency radiation can cause undesirable optically-dependent variations in the R.F. resonance frequency.

It is accordingly the object of this invention to overcome these and other limitations of the prior art by providing novel methods and apparatus whereby a large net alignment of atoms in a preferentially populated spin state of long lifetime is possible and whereby resonance signals of narrow width and strong signal strength may be produced.

One feature of the present invention is the use of a special coating for the walls of an absorption cell whereby the loss of spin orientation due to wall collisions can be minimized without requiring the inclusion of a buffer gas.

Another feature of the present invention is the provision of an optical absorption cell which is divided into at least two regions; a transmission region adapted to be placed in an optical radiation beam for preferentially populating the spin states of the atoms therein, and an atom bouncing region outside said optical radiation beam whereby the lifetime of atom spin states may be substantially increased.

Another feature of the present invention is the provision of an optical absorption cell in accordance with the preceding paragraph wherein an external disorienting process is localized between said two regions thereby permitting larger effective optical beam cross-sections than have heretofore been possible.

Another feature of the present invention is the provision of an optical absorption cell which is divided into at least two regions: an optical absorption region adapted to be placed in an optical radiation beam for preferentially populating the spin states of the atoms therein, and a R.F. interaction region adapted to be placed outside said optical radiation beam whereby undesired influences of said optical radiation on the R.F. interaction are eliminated.

Still another feature of the present invention is the provision of an optically pumped maser utilizing an absorption cell in accordance with the previous paragraph.

These and other features and advantages of the invention will become apparent from a perusal of the following specification taken in connection with the accompanying drawings wherein:

FIG. 1 is a block diagram of a frequency control system utilizing an absorption cell in accordance with the present invention, FIG. 2 is an energy level diagram used to explain the spin orientation process in the system of FIG. 1, FIG. 3 is a spin vector diagram used to explain the disorientation process in the system of FIG. 1, and FIG. 4 is a partially schematic view of an optically-pumped gas cell maser in accordance with the present invention.

In accordance with the present invention it has been found possible to eliminate the buffer gas used in prior art absorption cells and still substantially eliminate atom spin disorientation due to wall collisions by applying a non-relaxing coating to the cell walls. Such a coating should contain compounds or mixtures of compounds meeting one or more of the following requirements; (1) forces of attraction between a free atom and the wall should be small compared to the attraction between wall constituents, (2) the sound velocity and density of the coating material should be large in order to minimize energy transfer in atom-wall collisions, and (3) the coating material should be relatively free of paramagnetic ions and free electrons in order to suppress disturbance or exchange of free atom spins during the collisions.

Referring more particularly to requirement (1), the existence of the following wall surface characteristics are, in general, undesirable: broken bonds as, for example, in diamond; easily breakable bonds as, for example, in the C=C double bond; strong microscopic electrostatic fields as, for example, in ionic crystals. And the existence of the following wall surface characteristics are, in general, desirable: saturated covalent compounds; condensed phases held together only by Van der Waals forces (as in an inert gas); surface atoms having an electronegativity not substantially different from that of the colliding free atoms (for example, hydrogen surface atoms with a Pauling electronegativity of 2.1 would be suitable for colliding rubidium atoms having a Pauling electronegativity of 0.8); the binding energy of the wall constituents to each other being large compared to the binding energy between the surface atoms and the colliding free atoms (for example, a wall C–H binding energy of 87 kg.-cal./mole is desirable in the case of a free rubidium colliding atom having a binding energy to hydrogen of 44 kg.-cal./mole).

In view of the above requirements, the saturated paraffins, $C_nH_{2n+2}$, have been chosen as a preferred class of compounds. Preferably the number of carbon atoms should be larger than about twenty (for a low vapor pressure) and smaller than about fifty (for stability against thermal cracking). For example, cells coated with eicosane, $C_{20}H_{42}$, and dotriacontane, $C_{32}H_{66}$, are found to permit at least 1000 wall collisions before the occurrence of appreciable spin disorientation. It is clear from the previous discussion that such wall coatings are generally useful in preserving quantum mechanical spin states against the disorientating effects of collisions with cell walls, including the single region optical cells shown in the above-mentioned patent applications.

Referring to FIG. 1 there is shown as an example of a a novel multi-region configuration utilizing the above-described non-relaxing wall coating a dumbbell shaped absorption cell 11 having spherical bulbs 12 and 13 joined by a neck portion 14. Located in a finger extension 15 off the smaller spherical bulb 12 is a glass ampoule 16 containing a small quantity 17 of an alkali metal, such as rubidium, and also a small copper slug or hammer 18. A small amount of vacuum predistilled saturated paraffin compound, such as dotriacontane ($C_{32}H_{66}$), 17a, is placed within the cell 11 which is then evacuated and sealed off. The inside walls are coated by evaporating the dotriacontane contained within the cell. The ampoule 16 containing the rubidium is then broken, as by shaking the copper hammer 18 against the ampoule 16, thereby filling the interior of the cell 11 with rubidium or other alkali vapor at about room temperature. Provision is preferably made for the continuous evacuation of organic vapors in the cell as, for example, by an activated charcoal trap (not shown).

Where rubidium vapor is used atom alignment may be effected by light from a rubidium optical resonance spectral source 19 energized by a power supply or battery 21. The light is focused by lens 22 into a parallel beam in the direction of a weak unidirectional magnetic field $H_0$. The beam then passes through a filter bulb 23 containing a rubidium-85 vapor, bulb 12, lens 24 and finally energizes photocell 25.

Referring to FIG. 2 there is shown an energy level diagram for the rubidium-87 isotopes in the vapor of bulb 12. The optical radiation from source 19 may effect four possible transitions out of the $S_{1/2}$ ground state; transition A from the $F=1$ hyperfine sublevel due to the action of the "$D_1$" light (transitions to the $P_{1/2}$ level), transition B from the $F=2$ hyperfine sublevel due to the action of the "$D_1$" light, transition C from the $F=1$ hyperfine sublevel due to the action of the "$D_2$" light (transitions to the $P_{3/2}$ level) and transition D from the $F=2$ hyperfine sublevel due to the action of "$D_2$" light. If the rubidium-85 vapor in cell 23 is elevated to a temperature of about 50° centigrade, the spectral components of lamp 19 are so absorbed that transistions B and D are substantially eliminated while transitions A and C remain unaffected. Since atoms return from the excited $P_{1/2}$ and $P_{3/2}$ states without much discrimination as to the $F=1$ and $F=2$ sublevels, it results that the nonabsorbing $F=2$ sublevel becomes preferentially populated with respect to the absorbing $F=1$ sublevel, thus increasing the light intensity detected at 25 until an equilibrium value is reached.

For strong enough light intensity, the pumping time, $\tau$, required to put an atom into the $F=2$ state is determined by this intensity, the pumping time in the light beam decreasing as the light intensity increases. If a hole of cross-sectional area A is now provided in the bulb 12, the oriented atoms will bounce off the specially coated walls for a time $\tau_a$ without any appreciable spin disorientation until they find the opening of area A and pass through neck 14 into bulb 13. The time, $\tau_a$, is determined by:

$$(2) \quad \frac{S_a}{A} \cdot \tau_{f_a} \approx \tau_a$$

where $S_a$ is the surface area of bulb 12 and $\tau_{f_a}$ is the average time between wall collisions. For spherical bulbs the time $\tau_a$ may be fixed by using a bulb 12 of volume $V_a$ such that $$(3) \quad V_a \approx \frac{A \cdot v \cdot \tau_a}{3}$$

where $v$ is the average molecular velocity in the alkali vapor. In the same way, atoms bounce about bulb 13 of volume $V_b$ for a time, $\tau_b$, before passing back through neck 14 into bulb 12. Since bulb 13 is outside the light beam, the lifetime of the atom spin states therein is limited only by the number of wall collisions, N, which may occur before appreciable spin disorientation. Requiring only that the atoms return to aligning region 12 before such disorientation, $\tau_b$ for spherical bulbs may be as large as $$(4) \quad \tau_b \approx (N^{3/2}/v) \cdot \left(\frac{A}{4\pi}\right)^{1/2}$$

(N→number of wall-collisions before relaxation occurs).

The optimum value $V_b$ corresponding to this value of $\tau_b$ is then determined by the relationship $$V_b \approx \frac{A \cdot v \cdot \tau_b}{3}$$

If $\tau_a$ is designed to be no longer than about $\tau$, the lifetime of atoms in the preferentially populated state will be determined by $\tau_b$, since for large enough bulbs 13, $\tau_b$ can be made substantially larger than $\tau$. Thus, it is possible to produce a net alignment of atoms throughout the entire interior of the cell 11 which is much greater than that heretofore possible with the cells of the prior art.

In order to appreciably modify the light intensity detected by photocell 25 and thus produce strong signals, a disorientation process having a characteristic time $\tau_d$ approximately equal to $\tau$ must be introduced. Such a process is possible in the cell of FIG. 1 by causing those atoms which pass from bulb 12 through opening area A to become disoriented before being returned to bulb 12. A field independent process may take place in the following way:

The atoms in bulb 12 which are in the nonabsorbing $F=2$, $M=0$ hyperfine sublevel have their atomic spins $\vec{J}$ aligned parallel with their nuclear spins $\vec{I}$ (FIG. 3a) so that the total spin $\vec{F}=\vec{I}+\vec{J}=2$, both $\vec{I}$ and $\vec{J}$ being perpendicular to $H_0$. As the atoms pass through neck portion 14 they will interact with the R.F. magnetic field $H_1$ generated by a microwave cavity 26 adjacent thereto, $H_1$ being parallel to $H_0$. Field $H_1$ is designed to be of such strength that when it is at the hyperfine frequency $\nu_h$ separating levels $F=1$ and $F=2$, the spin vector $\vec{J}$, together with its associated magnetic moment, is tipped 90° as shown in FIG. 3b. For $J=\frac{1}{2}$, when the assumption is made that $\vec{I}$ is infinitely large, the peak value of the field $H_1$ in gauss is given by:

$$(5) \quad H_1 = \frac{1.8 \times 10^{-7}}{t}$$

where $t$ is the time in seconds for an atom to pass through the cavity 26.

For finite $\vec{I}$ a small correction has to be applied which may be readily determined experimentally. As more fully explained in my co-pending U.S. patent application Serial No. 653,180, now U.S. Patent 3,150,313, the atom is thereby placed in a time variant spin state with vector $\vec{J}$ precessing about the vector $\vec{I}$ at frequency $\nu_h$. The atom then bounces about in the bulb 13 for a time $\tau_b$ and returns through opening area A while still precessing in phase with $H_1$. As the atom again passes through the neck portion 14, the vector $\vec{J}$ is tipped another 90°, thereby placing the atom in the absorbing $F=1$ hyperfine sublevel. Thus as the frequency of generator 27 is slowly swept through the hyperfine resonance value an ultra narrow line signal is detected by photocell 25 due to the increase of atoms in the absorbing $F=1$ hyperfine sublevel.

Since the transmission and disorienting regions are physically separated, it is possible to make bulb 12, and thus the effective beam cross-section and associated signal strength (Equation 1), much larger than heretofore possible with a single region cell. As a typical example, for hyperfine frequencies of about 6000 mc., the area A should be about 2 cm.$^2$; for practical light source 19 a value $\tau = 10^{-2}$ sec. may be expected; and the molecular velocity $v$ is typically $3 \times 10^4$ cm./sec. From Equation 3, this gives a value $V_a = 200$ cm.$^3$. Further, using the value $N=1000$, Equation 4 gives an effective lifetime, $\tau_b$, of 0.3 sec. while the volume $V_b$ should in practice, have a value of about 6 to 8.5 liters. This large value of $\tau_b$ make possible hyperfine resonance linewidths on the order of one cycle as compared with 100 cycles as the narrowest line possible with the cells of the prior art.

In the system of FIG. 1, this ultra narrow line is used to stabilize the frequency of the R.F. generator 27 which provides the field $H_1$. When the generator 27 is operated precisely at the hyperfine frequency, $\nu_h$, a low frequency modulation superimposed thereon by frequency modulator 28 driven by sweep generator 29 produces no signal component at the modulating frequency in the signal detected by photocell 25. However, any tendency of the generator 27 to drift off the resonance frequency does produce a modulation frequency component in the signal of photocell 25, the phase of which depends on the direction of the drift. This signal component is then amplified in narrow band amplifier 31 and fed to the input of a phase sensitive detector 32 where it is compared with the sweep signal of generator 29. The output of phase sensitive detector 32 is then a D.C. signal of such magnitude and polarity as will stabilize the frequency of generator 27 at the hyperfine value. In the case of rubidium-87, $\nu_h = 6835$ mc.

Although spherical bulbs are used in the preferred embodiment in view of their simplicity and favorable volume-to-surface ratio, it is apparent that many other shapes are possible. For example, cylindrical bulbs with length-to-diameter ratio somewhat greater than one and with axis disposed parallel to the light beam have the advantage of minimizing undesirable disorienting effects caused by scattered light.

The novel cells of the present invention are not limited to the system of FIG. 1, but may be used in any system utilizing the detection of the energy state alignment of quantum systems. Examples of such systems are found in my aforementioned co-pending applications, and in the co-pending U.S. application of William E. Bell and Arnold L. Bloom, Serial No. 716,571, filed February 21, 1958, now U.S. Patent 3,246,254 and entitled "Atomic Stabilized Frequency Source" assigned to the same assignee. More particularly, the alignment may be with respect to either the hyperfine levels or the field dependent Zeeman sublevels and may be effected by various types of radiant energy spectral distributions, such as those wherein certain spectral components are polarized and/or attenuated either by external polarizers and filters or by the internal action of the absorption cell. And the disorienting process may be of any suitable type in accordance with the particular alignment process employed. Also it is apparent that the novel cells of the present invention may be used in systems which detect the alignment of energy levels other than by the intensity of the transmitted light, such as those systems wherein the population difference between energy level is detected by the intensity of the light scattered from the absorption cell.

FIG. 4 is an embodiment of the present invention particularly useful as a maser. The evacuated cell 40 is divided into three specially displaced regions: a reservoir region 41 containing a small deposit of vapor-evolving alkali metal 42 such as rubidium; an optical absorption region 43 into which a light beam (between dashed lines) is focused for optically pumping the alkali vapor atoms into the $F=2$ ground hyperfine state; and a microwave R.F. field interaction region 44 located within a microwave cavity resonator 45, region 44 communicating with region 43 via a small opening 46. Cell regions 43 and 44 are coated with non-relaxing material, whereas cell region 41 is left uncoated.

In operation, the light beam aligns or orients the atoms in cell region 43, and is of sufficient intensity to create a preferential population in the $F=2$ hyperfine state which will sustain stimulated emission of radiation due to transitions to the $F=1$ hyperfine state. These oriented atoms move into the cell region 44 where this stimulated emission is radiated into cavity resonator 45 tuned to the transition frequency, and the spectrally pure maser radiation so generated is coupled out via cavity coupling 47 for external utilization.

It is to be noted that in this embodiment the optical irradiation and microwave cavity fields are spatially separated so that, for example, the frequency of the microwave transitions in the cavity will not be influenced by the presence of the light. The small opening 46 between regions 43 and 44 make it unlikely that atoms which leave the cavity region 44 will interact with the light beam in region 43 and re-enter the cavity without first encountering the uncoated region 41 where they are disoriented, thereby insuring that the oriented atoms within the cavity region have no phase memory effects which are influenced by the light irradiation. As a further advantage, spatial separation of the optical irradiation and cavity regions avoids the undesirable reduction in the R.F. phase memory time which would occur in a combined region, due to the fact that with practical light profiles it is usually necessary to scatter as many as ten photons to pump up one atom.

The cell structure of FIG. 4 is also useful where optical detection of the non-absorbed light and/or a cavity-driving R.F. signal is used. For example, this cell structure could be used in the system of FIG. 1.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An optical absorption apparatus comprising an enlarged optical absorption cell region, means providing an optical radiation beam for aligning atoms in said region, an enlarged atom bouncing cell region adapted to be placed outside said optical radiation beam, said regions being interconnected by a narrow neck portion, and non-relaxing coating means on the interior walls of said regions for preserving the energy states of said atoms against the disorienting effects of collisions with said walls.

2. An optical absorption cell apparatus according to claim 1 further comprising means for disorienting the alignment of atoms passing through said neck portion.

3. An optical absorption cell apparatus according to claim 2 wherein the surface area of said optical absorption region, the cross-sectional area of said neck portion and the surface area of said bouncing region are so related that atoms leave the optical absorption region within a time ($\tau_a$) approximately equal to the pumping time ($\tau$) for atoms in the presence of the optical radiation beam and atoms remain in the bouncing region for a time $\tau_b > \tau$.

4. An optical absorption cell apparatus according to claim 3 wherein said aligned atoms are atoms of an alkali vapor and wherein said non-relaxing coating means contains at least one saturated paraffin compound $(C_nH_{2n+2})$ taken from the group consisting of eicosane and dotriacontane.

5. An optical absorption cell apparatus according to claim 3 wherein said optical radiation beam effects atom alignment in the $F=2$ hyperfine level of the $S_{1/2}$ ground state and wherein said disorienting means includes means for supplying electromagnetic energy at the hyperfine transition frequency to effect a 90° rotation of the atomic spin $\vec{J}$ with respect to the nuclear spin $\vec{I}$.

6. In combination, an optical absorption cell having a first region and a second region communictaing with the first region through a third passage region, said cell containing atoms in a vapor or gaseous state, a source of optical radiation for producing a beam of light through said first cell region of a spectral distribution to align said atoms in said first region in preferentially populated sublevels of an optically absorbing state, optical radiation detecting means for detecting said alignment, said second cell region being outside the beam path, a radio frequency source for providing a disorienting field which is concentrated in said passage region relative to said first and second regions, and means responsive to said optical radiation detection means for stabilizing the frequency of said radio frequency source.

7. Quantum resonance apparatus comprising: a vessel confining an assemblage of quantum mechanical particles in gas or vapor form, said vessel having first and second separate physically spaced regions and said particles being adapted to make repeated excursions between said regions; optical radiation means producing an optical irradiation concentrated in said first region relative to said second region for inducing optical resonance transitions of said particles; means for detecting the intensity modulation of the radiation passed through said first region and radio frequency means supporting a field concentrated in said second region relative to said first region for inducing radio frequency transitions of said particles.

8. The combination of claim 7 wherein said vessel has non-relaxing coating means on an interior surface portion thereof for preserving the energy states of said particles against the disorienting effects of collisions with said surface.

9. An optically pumped maser comprising: a vessel confining an assemblage of quantum mechanical particles in gas or vapor form, said vessel having first and second separate regions, said particles being adapted to make repeated excursions between said regions; non-relaxing coating means on the interior surface of said first and second regions for preserving the energy states of said particles against the disorienting effects of collisions with said surface; optical radiation means producing an optical irradiation concentrated in said first region relative to said second region for preferentially populating a high energy state of said particles; a resonator limited to said second region for receiving stimulated radiation emitted by said particles upon undergoing transitions from said high energy state to a lower energy state; and means for externally coupling said radiation from said resonator.

10. A maser according to claim 9 further including an uncoated vessel region communicating with said first vessel region for disorienting particles that pass to said first region from said second region.

11. A maser according to claim 10 wherein said particles are alkali vapor atoms, and further including in said uncoated region a deposit of the alkali metal generating said vapor.

12. An optical absorption cell apparatus comprising:
absorption cell means having a first optical transmission region and a second atom bounce region spaced from said first region by a neck portion;
a multiplicity of atoms in a vapor or gaseous state disposed in said absorption cell;
means for applying optical radiation to said first region for optically pumping said atoms to align such atoms;
means for detecting the optical radiation that passes through said first region;
a radio frequency means for applying a radio frequency field to such neck portion at the hyperfine frequency of said atoms;
a frequency modulator for applying a low frequency modulation to such radio frequency field;
a sweep generator for driving said frequency modulator; and
a phase detector coupled to said sweep generator and to said detecting means for comparing the sweep signal from the sweep generator and the detected radiation, whereby a D.C. signal is produced for stabilizing the frequency of the radio frequency means.

References Cited by the Examiner

UNITED STATES PATENTS

| | | | |
|---|---|---|---|
| 2,836,722 | 5/1958 | Dicke et al. | 250—36 |
| 2,948,861 | 8/1960 | Babb | 330—4 |
| 2,955,262 | 10/1960 | Arditi | 331—3 |

OTHER REFERENCES

Hackh's Chemical Dictionary, third edition, The Blakiston Co., Philadelphia, 1944, page 615.

Robinson et al.: "Preservation of Spin State in Free Atom—Inert Surface Collisons," bulletin of the American Physical Society, Series II, vol. 3, January 29, 1958, page 9.

Wittke et al.: "Redetermination of the Hyperfine Splitting in the Ground State of Atomic Hydrogen," Physical Review, vol. 103, August 1, 1956, pages 620–631.

Ramsey: "Resonance Experiments in Successive Oscillatory Fields," Review of Scientific Instruments, vol. 28, January 1957, pages 57, 58.

Dehmelt: "Slow Spin Relaxation of Optically Polarized Sodium Atoms," Physical Review, vol. 105, March 1, 1957, pages 1487–1489.

ROY LAKE, *Primary Examiner.*

S. H. GRIMM, *Assistant Examiner.*